(12) United States Patent
Kawanishi

(10) Patent No.: US 6,819,475 B2
(45) Date of Patent: Nov. 16, 2004

(54) OPTICAL FREQUENCY CONVERTER

(75) Inventor: Tetsuya Kawanishi, Tokyo (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 364 days.

(21) Appl. No.: 10/099,957

(22) Filed: Mar. 19, 2002

(65) Prior Publication Data

US 2002/0181073 A1 Dec. 5, 2002

(30) Foreign Application Priority Data

Mar. 19, 2001 (JP) ........................................ 2001-078068

(51) Int. Cl.[7] .............................. G02F 1/35; G02F 2/02
(52) U.S. Cl. ..................................................... 359/326
(58) Field of Search ................................ 359/238–240, 359/259, 263, 264, 276, 278–279, 284, 298, 307–308, 526, 578, 246, 326, 328, 329; 385/1–3

(56) References Cited

U.S. PATENT DOCUMENTS

| | | | |
|---|---|---|---|
| 4,040,865 A | 8/1977 | Eggers, III et al. | .............. 134/7 |
| 5,734,493 A | * 3/1998 | Jopson | ........................ 359/326 |

FOREIGN PATENT DOCUMENTS

JP         11-95184        4/1999

OTHER PUBLICATIONS

T. Kawanishi, et al., The Institute of Electrons, Information and Communication Engineers, pp. 7–12, "Reciprocating Optical Modulation for Optical Frequency Shift", Feb. 2001 (with English abstract and corr. reference AU).

T. Kawanishi, et al., The Institute of Electrons, Information and Communication Engineers, 3 pages, "Reciprocating Optical Modulation for Harmonic Generation", Feb. 2001 (corr. to reference AW).

Aoyama, et al., O Plus E, vol. 22, No. 11, pp. 1456–1470, "Photonic Networks: Outlook and Technical Issues", Nov. 2000.

T. Kobayashi, Applied Physics, vol. 67, No. 9, pp. 1056–1060, "Generation of Ultrashort Light Pulses Using a Domain–Inversion External Phase Modulator", 1998.

A. Inoue, C–3–67, Conference 2000 of the Institute of Electronics, Information and Communication Engineers, pp. 246–247, "Development Trends in Grating Technology", 2000.

* cited by examiner

*Primary Examiner*—Hung Xuan Dang
*Assistant Examiner*—Joseph Martinez
(74) *Attorney, Agent, or Firm*—Oblon, Spivak, McClelland, Maier & Neustadt, P.C.

(57) ABSTRACT

An optical frequency converter that can use a low-amplitude, high-frequency signal for converting a wide range of optical frequencies. The optical frequency converter includes a device for modulating a lightwave of a preset frequency with a modulation signal to generate a group of sidebands thereof, a device for selecting sidebands from among the group of sidebands, and a device for changing modulation signal frequencies and selecting specific sidebands.

20 Claims, 5 Drawing Sheets

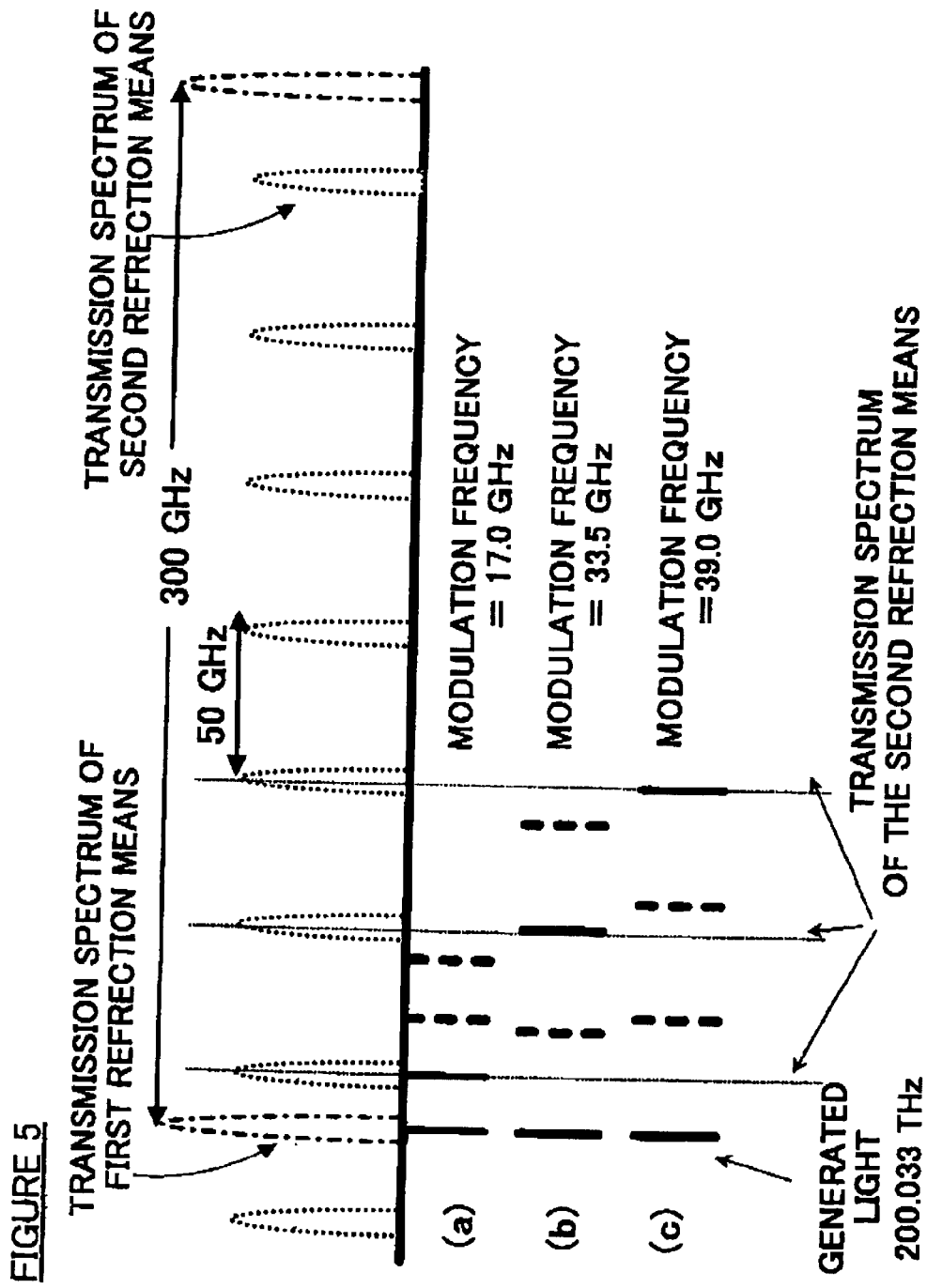

OPTICAL FREQUENCY CONVERTER

BACKGROUND OF THE INVENTION

1. Field of the Invention

The present invention relates to an optical frequency converter that can be used as a variable-wavelength light source of optical routing devices and the like used as switches in optical communications, and more particularly to an optical frequency converter that can be used as a variable-wavelength light source in which the optical wavelength rapidly stabilizes even when switched at high speed.

2. Description of the Prior Art

In the field of optical communications, methods of distributing input optical signals among a number of transmission lines include the following: 1) a method in which the optical signals are converted into electrical signals and then re-transmitted as optical signals along the corresponding transmission lines and 2) a method in which the optical signals are distributed as they are, with each signal being sent to the transmission line concerned in accordance with differences in the wavelength of the light carrying the signal. It is also known that more information is transmitted using the latter method.

The latter method is described, for example, in Reference (Aoyama et al., "Photonic Networks: Outlook and Technical Issues," O plus E, vol. 22, No. 11 November 2000, pp. 1456–1470). Optical signals input from a plurality of waveguides that have the same wavelength can be transmitted by a single waveguide by changing the carrier wavelength for each of the signals input. This is a well-known method that is also described by the above reference.

In the latter method in which the optical signals are distributed as they are, a variable-wavelength light source is used. Thus, it can be readily understood that it is desirable to use a variable-wavelength light source that is capable of high-speed operation and also has stable characteristics.

light sources that have conventionally been used for this purpose include distributed Bragg reflection (DBR) lasers and distributed feedback (DFB) lasers. However, after a wavelength has been changed, it takes several tens of milliseconds for the output wavelength to stabilize, and in the case of 40-gigabit/second optical communications in which data is transmitted in 4000-bit packets, the time required to stabilize is longer than the time it takes to transmit one packet (100 ns), posing an obstacle to such high-speed communications.

The present invention can be used for the above purpose, and relates to a variable-wavelength light source that uses a high-frequency signal to convert an optical frequency. Prior-art examples of such a light source are described below.

There are a number of known ways converters work to convert the frequency of an optical input. These include (1) the input of two types of light to non-linear optical crystal to mix the two lightwaves. This is already well known, and is also used for doubling laser frequencies. Also included is (2) a method using a mode-locked laser, comprising using an optical modulator, isolator and Fabry-Perot etalon provided in a laser resonator to generate light pulses. This is also known as a method for generating a sideband of frequency fp that is Km times higher than phase modulation frequency fm (fp=Km*fm). There is also (3) a method comprising modulating the light with a high-frequency signal to derive a sideband that is used to convert the optical frequency.

Using these methods, lightwaves are converted to different frequencies as follows. In the case of the above (1), at least one of the lightwaves is changed to light of a different frequency. In the case of (2), a filter is also provided to select a generated sideband in order to change the light to light of a different frequency. In the case of (3), the frequency of the high-frequency signal is changed. Thus, it can perhaps be readily seen that such methods can be used to change optical frequencies.

The present invention is partly similar to (3) in which the lightwave is modulated by a high-frequency signal to obtain a sideband for converting the frequency. This is explained below Using a high-frequency signal to modulate a lightwave is usually accomplished by inputting the optical carrier wave and high-frequency signal to an optical modulator and performing intensity modulation or phase modulation or the like. With this method, when a sideband is obtained having a frequency higher than that of the applied high-frequency signal, the high-frequency signal is multiplied, producing an electrical signal of an even higher frequency that is used for the modulation. Even when the high-frequency signal is thus multiplied, the maximum modulation frequency is limited by the upper limit of the electrical signal. Thus, multiplication or amplification of an electrical signal has been subjected to the maximum frequency limitation of the electrical circuit concerned There has therefore been a need for a means of overcoming this.

There have been reports of using phase modulation with a high modulation index in an attempt to obtain a sideband having a higher frequency than that of the applied high-frequency signal. One such report (Reference 1: "Generation of ultrashort light pulses using a domain-inversion external phase modulator," by Tetsuro Kobayashi, Applied Physics, vol 67, No. 9 (1998), pp. 1056–1060) stated that, with a modulation index of 87 radian, applying a 16.26-GHz high-frequency signal to an optical modulator with a strip-line resonator provided on a waveguide formed of electro-optical LiTaOs crystal resulted in a spectral width of around 2.9 THz.

Reference 2 (U.S. Pat. No. 5,040,865) describes the method of using a high-frequency signal to modulate monochromatic light with a modulator having nonlinear characteristics, producing a high-order sideband that, by using an optical detector to detect the optical signal, is used to produce a high-frequency signal. The disclosure describes using a first modulator to generate a first high-frequency signal by the above method, applying the signal to a second modulator to use the method to perform modulation with a second high-frequency signal, However, since this uses an electrical signal that is multiplied by an applied high-frequency signal, it is subject to the frequency constraints of the circuit.

To perform the above-described phase modulation using a high modulation index, it is necessary to realize a high modulation index. With this being the aim, in order to increase the amplitude of the high-frequency signal, a strip-line resonator is used as a modulator electrode, which makes it difficult to change the modulation frequency. If, to avoid this, the resonator is not used as the electrode, a high-amplitude high-frequency signal becomes a requirement, so the high-frequency signal is amplified. While it might seem that in this case, it is an easy way of changing the optical frequency by changing the modulation frequency, it is well known that the bandwidth of the amplifier determines upper frequency limit of the modulation signal and the obtained light frequency.

An object of the present invention is to provide an optical frequency converter that has a configuration that makes it possible to obtain high-order sidebands with a high-frequency signal having a lower amplitude than that of the above means of phase modulation using a high modulation index, enabling conversion over a wide range of frequencies even with a low-amplitude high-frequency signal.

SUMMARY OF THE INVENTION

To attain the above object, the first point of the present invention relates to an optical frequency converter comprising means for modulating light of predetermined frequency with a modulation signal to obtain a group of sidebands thereof, means for selecting sidebands from among the group of sidebands, and means for changing frequency of the modulation signal and selecting a predetermined sideband.

The object is also attained by the second point of the present invention that relates to an optical frequency converter comprising means for modulating light of predetermined frequency with a modulation signal to obtain an n-th order group of sidebands thereof where n is a predetermined integer of 1 or more, means for modulating the n-th order group of sidebands to obtain an n+1-th order group of sidebands, means for selecting predetermined sidebands from among a group of numerous sidebands, and means for changing frequency of the modulation signal and changing a predetermined sideband Here, n-th order sideband means a sideband that is separated from the carrier wave by a frequency amount that is n times the modulation frequency, and n-th order group of sidebands means two sidebands that are symmetrically positioned relative to the carrier wave.

For performing multiplex modulation, the third point of the present invention relates to an optical frequency converter that in addition to the first or second point can include reflecting means for folding an optical path in the optical frequency converter.

For performing multiplex modulation, the fourth point of the present invention relates to an optical frequency converter that in addition to the first, second or third point can also include modulation means to at least one of which are input a group of different-order sidebands.

To form an optical circuit for performing multiplex modulation, the fifth point of the present invention relates to an optical frequency converter that in addition to the third point can also include a first reflecting means that transmits light of the predetermined frequency prior to modulation, and a second reflecting means having a plurality of transmission band.

To form an optical circuit for perform multiplex modulation, the sixth point of the present invention relates to an optical frequency converter that in addition to any one of the first to fifth points can also include a first reflecting means comprised of a laser light source and a first narrow-bandpass filter, and a second reflecting means comprised of an optical modulator and a second narrow bandpass filter.

In order to optimize the intensity of the output light, the seventh point of the present invention relates to an optical frequency converter that in addition to any one of the first to sixth points can also include means for changing the length of an optical path of the optical frequency converter.

Further features of the invention, its nature and various advantages will be more apparent from the accompanying drawings and following detailed description of the invention.

BRIEF DESCRIPTION OF THE DRAWINGS

FIG. 5 shows the relationship between sidebands, modulation frequency and Fabry-Perot filter transmission spectrum.

DESCRIPTION OF THE PREFERRED EMBODIMENT

Figure 3:
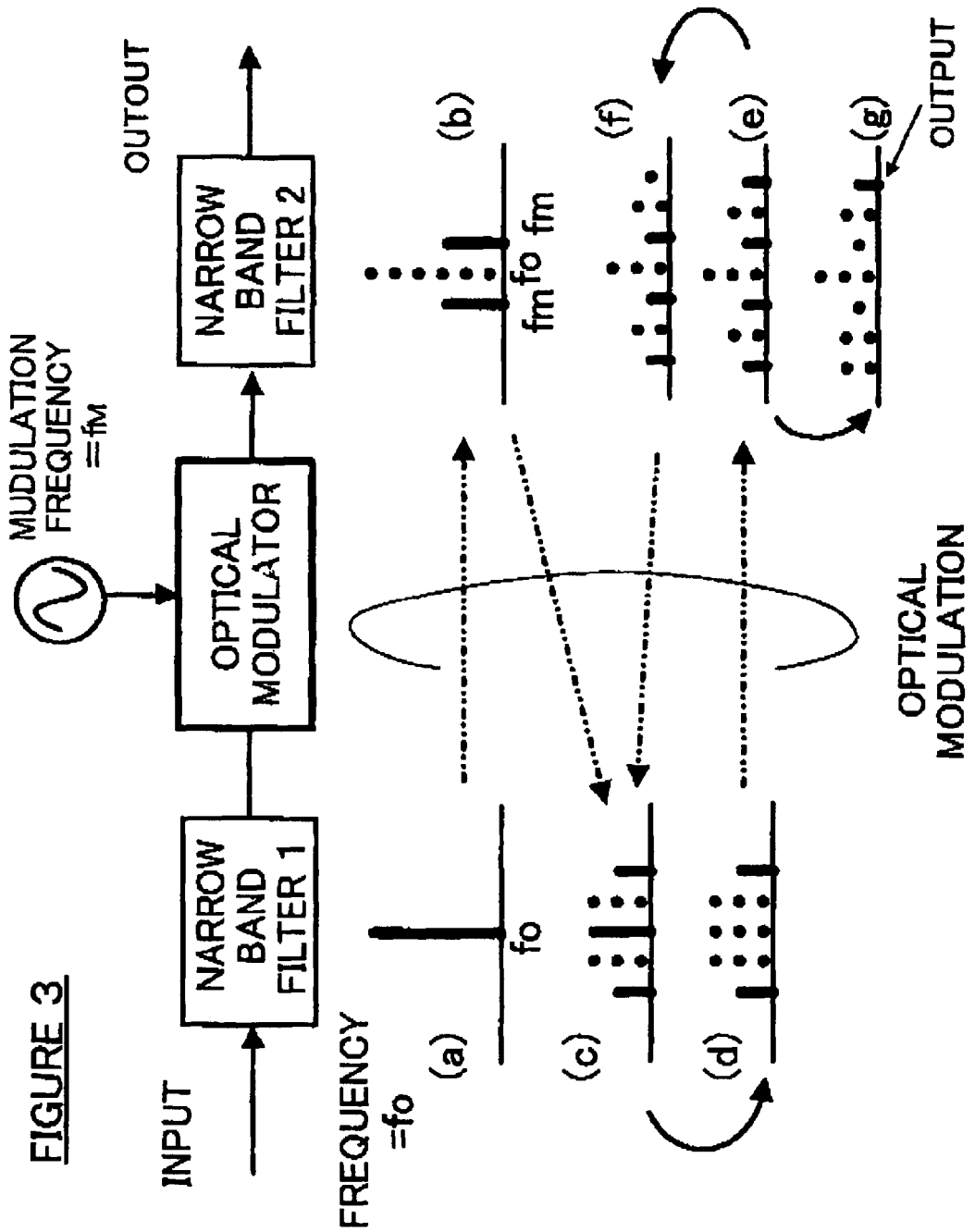
FIG. 3 is a block diagram illustrating the basic principle of the optical frequency converter.

Details of embodiments of the present invention will now be described with reference to the drawings. First, the principle of the invention will be explained, with reference to FIG. 3. In FIG. 3, the input lightwave has a frequency $f_o$. A narrow bandpass filter 1 transmits the input lightwave of frequency $f_o$ and reflects light having a slightly different frequency than that of the input lightwave. The optical modulator is an intensity modulator that can modulate light-waves traveling to the left or right with the same modulation frequency $f_m$. A filter 2 is a narrow bandpass filter having a different pass-band center to that of the filter 1, and has a smaller free spectral range (FSR) than the filter 1.

The input lightwave of frequency $f_o$ passes through the filter 1 and is modulated, generating the sidebands shown in FIG. 3(b). For the sake of simplicity, modulation is assumed to he linear. It is also assumed that the original carrier wave disappears in the modulation and that only a group of first-order sidebands is generated. The first-order sidebands that do not correspond to the transmission spectrums of the narrow bandpass filter 2 are reflected back through the intensity modulator, in the course of which the sidebands undergo modulation that gives them the spectrum shown in FIG. 3(c). Components corresponding to the carrier wave are transmitted by the narrow bandpass filter 1, so just the sideband is reflected, as shown in FIG. 3(d), and is followed by modulation, resulting in the spectrum of FIG. 3(e). This modulation gives rise to first-order and third-order sidebands. When the wavelength of a third-order high-frequency sideband shown in FIG. 3(g) corresponds to the transmission spectral bands of the narrow bandpass filter 2, it is transmitted by the filter 2. In this way, a lightwave input from the narrow bandpass filter 2 is output with a frequency that has been tripled by the high-frequency signal. Also, a sideband can be matched to a transmission spectrum of the narrow bandpass filter 2 by changing the frequency of the high-frequency signal. Conversely, this means that the frequency of the high-frequency signal and the requisite sideband order can be clarified by specifying the position from the center frequency of the transmission spectrum.

The above explanation has been made with reference to an optical modulator that is an intensity modulator, but the same effect can be obtained with a phase modulator. For the purpose of the present invention, a preferred modulator is a traveling-wave type modulator. With a traveling-wave type modulator, a lightwave traveling in either direction can be modulated with the same characteristics by inputting the modulation signal via the electrode provided at each end.

Figure 1:
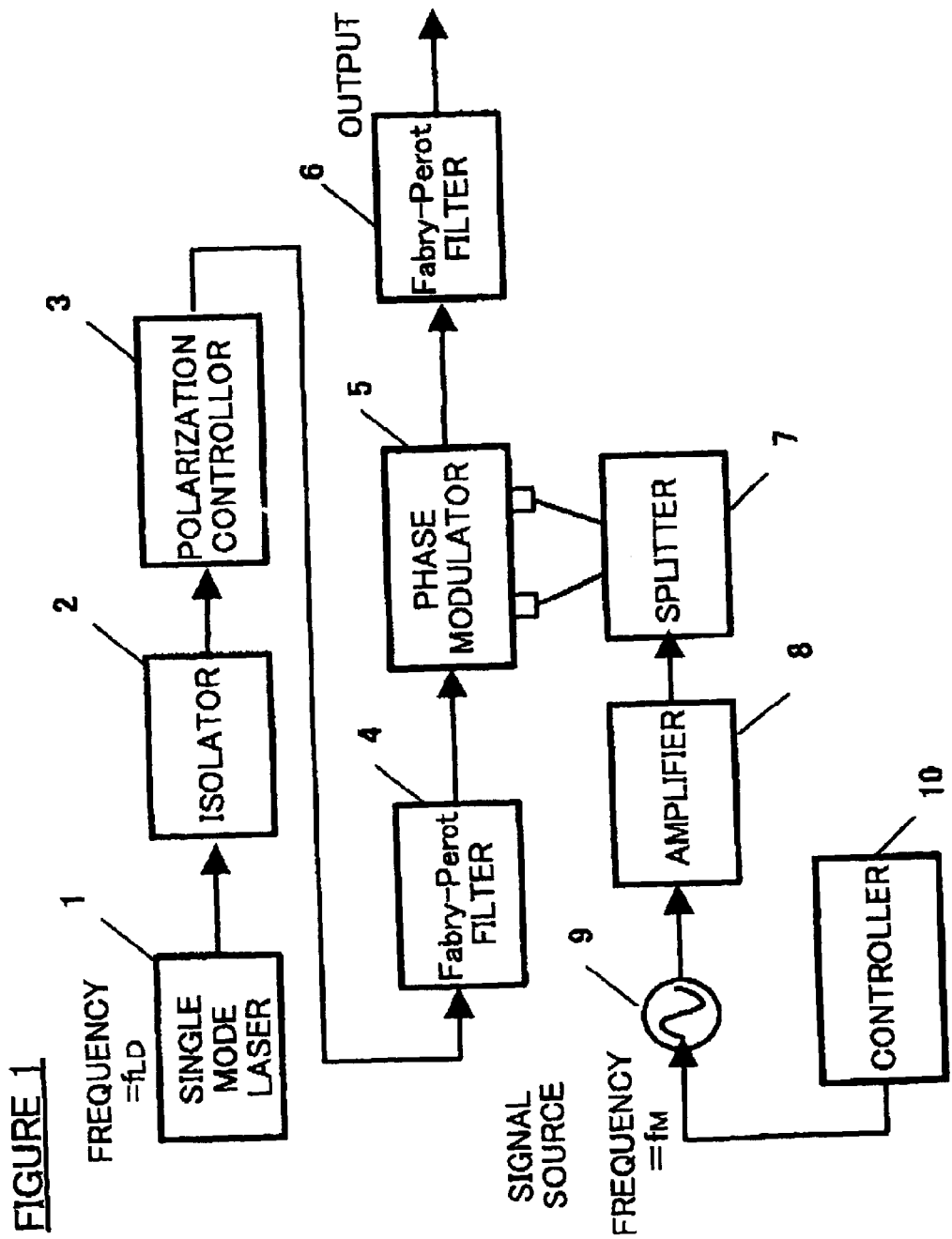
FIG. 1 is a blocks diagram of a preferred embodiment of the optical frequency converter of the present invention.
Figure 4:
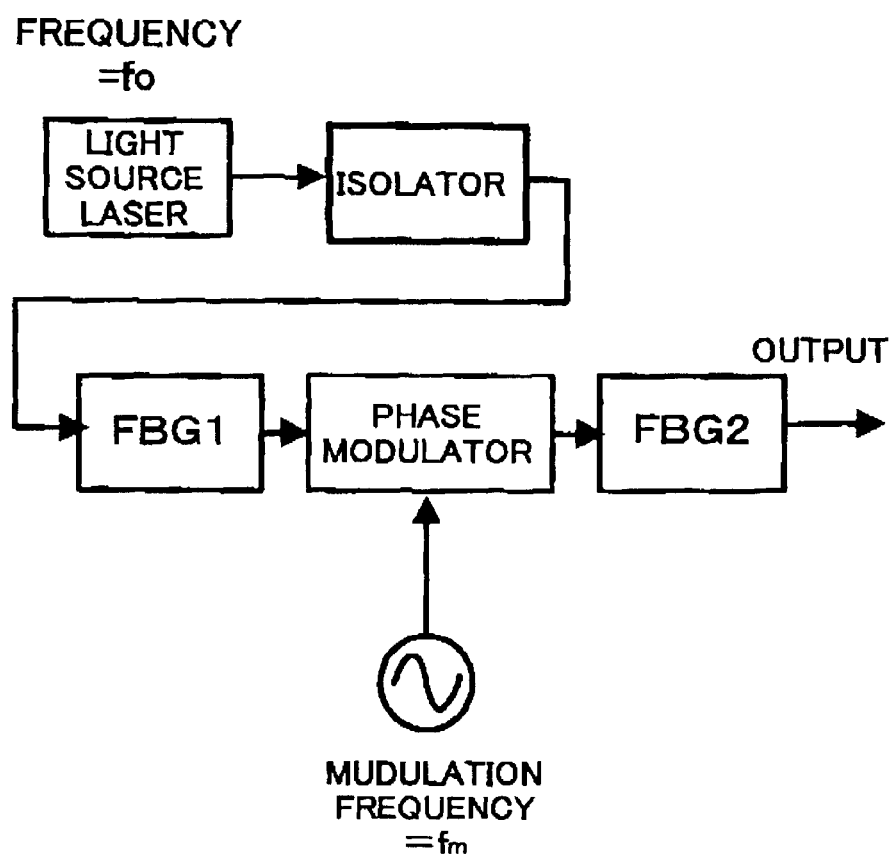
FIG. 4 is a block diagram of a test apparatus for demonstrating the principle of the optical frequency converter.

FIG. 4 shows a test means for demonstrating the principle of the invention. By means of reflection by a fiber grating (FBG) 1 and a fiber grating (FBG) 2, a lightwave input to the optical modulator is repeatedly reflected back and forth to obtain high-order sidebands. The source laser is a semiconductor laser with a wavelength of 1550 nm and an output of 10 mW; the isolator is a commercial one manufactured by Newport Corporation. The gratings were made by 3M Company, and are described, for example, in Reference 3 (Toru INOUE, "Development Trends in Grating Technology," C-3-67, Conference 2000 of The Institute of Electronics, Information and Communications Engineers, pp. 246–247). The optical modulator is a traveling-wave type manufactured by Sumitomo-Osaka Cement Co., Ltd. that can be operated by a high-frequency signal input of up to 40 GHz. Using these components, it was possible to obtain a –32 dBm sideband output 210 GHz from the carrier wave by inputting a 30-GHz, 27.8 dBm modulation signal, FIG. 1 shows a preferred embodiment of the optical frequency converter of the present invention. The optical frequency converter comprises a single mode laser source 1 that emits light at a preset frequency (laser frequency $f_{LD}$=200.033 THz), an isolator 2 to suppress the effect of light traveling back, a polarization controller 3, a Fabry-Perot filter 4 (with a transmission spectrum of 200.033 THz and a FSR of 300 GHz) forming a first reflecting means, an optical phase modulator 5 for performing the modulation with a modulation signal and generating sidebands, a Fabry-Perot filter 6 (with a transmission spectrum of 200.000 THz and a FSR of 50 GHz) forming a second reflecting means, a splitter 7, an amplifier 8, and a high-frequency signal source 9. The frequency of the high-frequency signal source 9 can be changed, changing modulation frequency, and constitutes the above sideband selection means.

A lightwave from the single mode laser source 1 passes through the Fabry-Perot filter 4 and is phase-modulated by the optical phase modulator 5. Phase modulation produces high-order sidebands.

FIG. 5 shows the relationship between sidebands, modulation frequency and the transmission spectrum of the Fabry-Perot filter 6. A modulation frequency of 17 GHz results in a first-order sideband of frequency 200.050 Hz. Since that is within the transmission spectrum of the Fabry-Perot filter 6, it can pass through the filter 6, but the second-order sideband having a frequency of 200.067 GHz cannot pass through the Fabry-Perot filter 6, and neither can the third-order sideband having a frequency of 200.084 GHz.

A modulation frequency of 33.5 GHz results in a first-order sideband of frequency 200.0665 GHz. Since that is not within the transmission spectrum of the Fabry-Perot filter 6, it cannot pass through the filter 6, but the second-order .sideband having a frequency of 200.100 GHz can pass through the Fabry-Perot filter 6. The third-order sideband of 200.1335 GHz also cannot pass through the Fabry-Perot filter 6. Other lightwaves can pass through the Fabry-Perot filter 6. Table 1 shows the relationship between the modulation frequency that produces this light, and the sideband order.

TABLE 1

| The order from the center frequency of interest of the Fabry-Perot filter 6 transmission spectrum n | Difference between the transmission spectrum of interest and the single mode laser source frequency (GHz) | Sideband order k | Modulation frequency (GHz) |
|---|---|---|---|
| 1 | 17 | 1 | 17.0 |
| 2 | 67 | 2 | 33.5 |
| 3 | 117 | 3 | 39.0 |
| 0 | 33 | 1 | 33.0 |
| 1 | 83 | 2 | 41.5 |
| 2 | 133 | 3 | 44.3 |
| 3 | 183 | 4 | 45.75 |

Thus, when the frequency of the single mode laser source 1 is fixed, lightwave frequencies can be instantaneously switched by selecting a modulation frequency and sideband order that match a transmission spectrum of the Fabry-Perot filter 6. With respect to the positive integers n, and k, taking k as sideband order, n as the order from the center frequency of the transmission spectrum of the Fabry-Perot filter 6, $f_{LD}$ as the frequency of the single mode laser source 1, $f_{FP}$ as the center spectral frequency of the Fabry-Perot filter 6, with $f_{FSR}$ denoting the FSR frequency and $f_M$ the modulation frequency, the following relationships are obtained.

$$f_{LD}+k \times F_M = f_{FP}+n \times f_{FSR}, \text{ or}$$

$$f_{LD}-k \times f_M = f_{FP}+n \times f_{FSR}, \text{ or}$$

$$f_{LD}+k \times f_M = f_{FP}-n \times f_{FSR}, \text{ or}$$

$$f_{LD}-k \times f_M = f_{FP}-n \times f_{FSR}.$$

So, each value can be set in accordance with these relationships.

Values thus obtained are stored in controller 10 and referred to, if necessary, to set k and modulation frequency fm for a given n. With respect to the high-speed switching of modulation frequency $f_M$, there are existing high-frequency oscillators capable of switching within 10 to 20 ns, and these can be used to realize the high-speed switching of lightwave frequencies.

An advantage of the present invention is that it is not necessary to prepare a high-frequency signal able to cover the lightwave frequency range, since the object can be attained using a high-frequency signal with about one-fourth the range.

Figure 2:
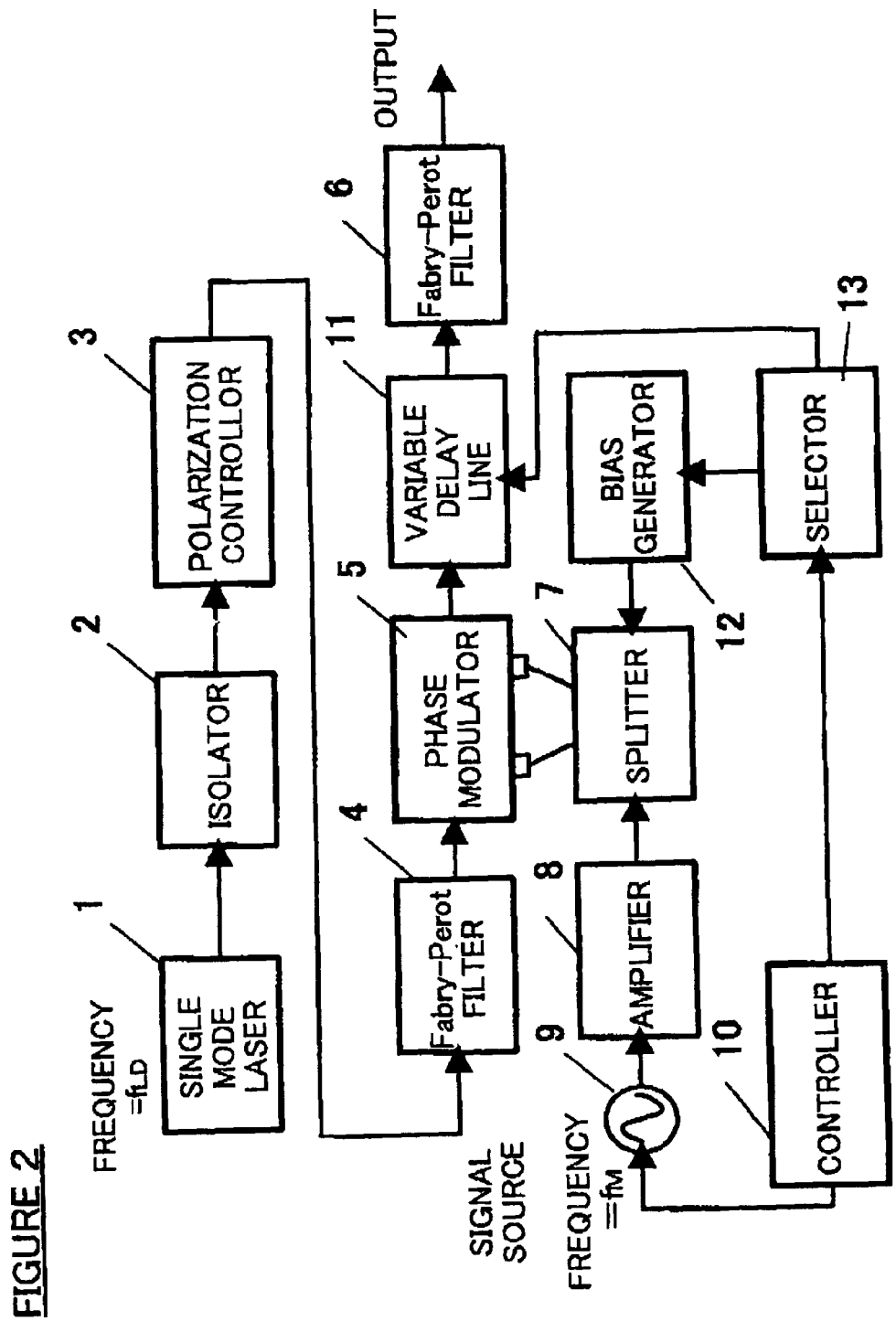
FIG. 2 is a block diagram of another preferred embodiment of the optical frequency converter of the present invention.

FIG. 2 shows another preferred embodiment of the optical frequency converter of this invention. This optical frequency converter comprises a single mode laser source 1, an optical isolator 2, a polarization controller 3, a Fabry-Perot filter 4 (with a transmission spectrum of 200.033 THz and a FSR of 300 GHz), an optical phase modulator 5, a variable optical delay line 11 that can be used to externally control the length of the optical path, a Fabry-Perot filter 6 (with a transmission spectrum of 200.000 THz and a FSR of 50 GHz), a splitter 7, an amplifier 8, and a high-frequency signal source 9. The variable optical delay line 11 can be constituted by a conventional means, such as a prism or reflector, that is used to change the free-space optical path, or by using an optical fiber that is heated to employ thermal expansion to change the length of the optical path, or the length of the optical fiber can be mechanically changed by using a piezoelectric element or a magnetostrictor.

The effect of the variable optical delay line 11 is that it optimizes the optical output intensity by adjusting the length of the optical path between the Fabry-Perot filter 4 and the Fabry-Perot filter 6. In the course of obtaining high-order sidebands by repeatedly reflecting the lightwave input to the optical modulator back and forth between the Fabry-Perot filters 4 and 6, the intensity of the optical output depends on the phase of the light at the point of reflection. Since this light phase depends on the phase of the light from the single mode laser source 1, the modulation frequency and the length of the optical path, the length of the optical path is adjusted to optimize the intensity of the output lightwave. The variable optical delay line 11 is controlled by the controller 10, being switched to match the switching of the lightwave frequency. Thus, in the case of this embodiment, with respect to a given n, in addition to the aforementioned switching of k and $f_M$, variable optical delay line 11 conditions are also changed.

As described in the foregoing, the variable optical delay line 11 is used to adjust the light phase to optimize the intensity of the output light by adjusting the optical path length. However, this can also be achieved by using a bias generator 12 controlled by the controller 10 to apply a bias voltage to the optical phase modulator 5 to thereby adjust the phase. The advantage of using a bias voltage to optimize the output intensity is the short response time. An advantage of using the variable optical delay line 11 for the adjustment is that it can be used in high-noise-level environments. This embodiment uses a selector 13 to select the adjustment means.

To ensure stable operation under changing ambient temperature conditions, it is desirable to be able to externally control the transmission spectrum characteristics of the narrow bandpass filter 2, via such means as voltage, current, temperature, magnetic field or electromagnetic waves. This can be done by using the Fabry-Perot etalon type variable-wavelength filter in a cavity filled with dispersion type polymer liquid crystal described, for example, in Reference 4 (JP-A HEI 11-95184), Reference 5 (Shimotsu and four others, "Subcarrier Generation by Integrated Type LN Phase Modulator," C-3–20, Conference 2000 of The Institute of Electronics, Information and Communications Engineers, p. 199) describes a modulator that attenuates the carrier wave, leaving sidebands, which modulator can be used instead of the aforementioned modulator.

The optical modulator can also be a semiconductor-based absorption type, a Mach-Zehnder type intensity modulator that uses a material having an electro-optical effect, or a phase modulator having an electro-optical effect.

As long as the optical amplifier used in this means is located between the narrow bandpass filters 1 and 2, its placement has no particular significance, with the same effect being forthcoming even if it and the variable optical delay line 11 exchange places.

Each of the above embodiments has been described as using a Fabry-Perot filter as the narrow bandpass filters 1 and 2. However, the filters do not have to be Fabry-Perot filters, it being also possible to use fiber Bragg gratings, for example, to form tie narrow bandpass filters. An advantage of using a fiber Bragg grating is that it enables the optical path to be configured inside the optical fiber, which makes it possible to prevent loss of signal intensity during optical signal input/output outside the fiber. Another merit is that by changing the fiber Bragg grating structure, it is possible to form a filter having a different period to that of a Fabry-Perot filter, in which the transmission band periods are equally spaced.

The present invention thus configured using the means described in the foregoing, provides the following effects.

The optical frequency converter configuration that includes means for modulating light of predetermined frequency with a modulation signal to obtain a group of sidebands thereof, means for selecting sidebands from among the group of sidebands, and means for changing frequency of the modulation signal and selecting a predetermined sideband makes it possible to instantaneously switch optical signal frequencies by selecting the high-frequency signal frequency and sideband order.

Also, the use of repeated modulations makes it possible to instantaneously switch optical signal frequencies with a smaller modulation signal.

Also, using reflecting means to configure a folded optical path makes it possible to perform multiplex modulation.

Moreover, since repeated modulation operations can be performed with a single modulator, the number of modulators used can be decreased.

Also, the second reflecting means having a plurality of transmission bands that is used for sideband selection is an existing, well-known optical component, facilitating the configuration of an optical frequency converter that can switch optical frequencies.

The fact that the laser source, the reflecting means used to form the narrow bandpass filters and the optical modulator are also existing, well-known means also makes it readily possible to realize an optical frequency converter that can switch lightwave frequencies.

In addition, in the seventh invention, the inclusion of means for adjusting the length of the optical path makes it possible to obtain output light of optimum intensity.

What is claimed is:

1. An optical frequency converter, comprising:
   means for modulating light of predetermined frequency with a modulation signal to obtain an n-th order group of sidebands thereof where n is a predetermined integer of 1 or more;
   means for modulating the n-th order group of sidebands to obtain an n+1-th order group of sidebands;
   means for selecting predetermined sidebands from among a group of numerous sidebands; and
   means for changing frequency of the modulation signal and changing a predetermined sideband.

2. An optical frequency converter according to claim 1 that includes reflecting means for folding an optical path in the optical frequency converter.

3. An optical frequency converter according to claim 2 that includes one or more modulation means to at least one of which modulation means are input a group of different order sidebands.

4. An optical frequency converter according to claim 3 that includes first reflecting means comprised of a laser light source and a first narrow-bandpass filter, and second reflecting means comprised of an optical modulator and a second narrow-bandpass filter.

5. An optical frequency converter according to claim 4 that further comprises means for changing a length of an optical path of the optical frequency converter.

6. An optical frequency converter according to claim 3 that further comprises means for changing a length of an optical path of the optical frequency converter.

7. An optical frequency converter according to claim 2 that includes first reflecting means that transmits light of the predetermined frequency prior to modulation, and second reflecting means having a plurality of transmission bands.

8. An optical frequency converter according to claim 7 that includes first reflecting means comprised of a laser light source and a first narrow-bandpass filter, and second reflecting means comprised of an optical modulator and a second narrow-bandpass filter.

9. An optical frequency converter according to claim 8 that further comprises means for changing a length of an optical path of the optical frequency converter.

10. An optical frequency converter according to claim 7 that further comprises means for changing a length of an optical path of the optical frequency converter.

11. An optical frequency converter according to claim 2 that includes first reflecting means comprised of a law light source and a first narrow-bandpass filter, and second reflecting means comprised of an optical modulator and a second narrow bandpass filter.

12. An optical frequency converter according to claim 11 that further comprises means for changing a length of an optical path of the optical frequency converter.

13. An optical frequency converter according to claim 2 that further comprises means for changing a length of an optical path of the optical frequency converter.

14. An optical frequency converter according to claim 1 that includes one or more modulation means to at least one of which modulation means are input a group of different order sidebands.

15. An optical frequency converter according to claim 14 that includes first reflecting means comprised of a laser light source and a first narrow-bandpass filter, and second reflecting means comprised of an optical modulator and a second narrow bandpass filter.

16. An optical frequency converter according to claim 15 that further comprises means for changing a length of an optical path of the optical frequency converter.

17. An optical frequency converter according to claim 14 that further comprises means for changing a length of an optical path of the optical frequency converter.

18. An optical frequency converter according to claim 1 that includes first reflecting means comprised of a laser light source and a first narrow-bandpass filter, and second reflecting means comprised of an optical modulator and a second narrow bandpass filter.

19. An optical frequency converter according to claim 18 that further comprises means for changing a length of an optical path of the optical frequency converter.

20. An optical frequency converter according to claim 1 that further comprises means for changing a length of an optical path of the optical frequency converter.

* * * * *